United States Patent [19]
Myers

[11] Patent Number: 5,222,707
[45] Date of Patent: Jun. 29, 1993

[54] PORTABLE BICYCLE REPAIR STAND

[76] Inventor: David J. Myers, HC 75, Box 2476, Camp Verde, Ariz. 86322

[21] Appl. No.: 793,253

[22] Filed: Nov. 12, 1991

Related U.S. Application Data

[63] Continuation-in-part of Ser. No. 729,059.

[51] Int. Cl.$^5$ .............................................. A45D 42/14
[52] U.S. Cl. ............................... 248/206.1; 248/206.3; 211/18; 224/319
[58] Field of Search ........................ 248/206.1, 206.3; 211/18, 17, 22; 224/319, 329, 42.46

[56] References Cited

U.S. PATENT DOCUMENTS

| | | | |
|---|---|---|---|
| 512,548 | 1/1894 | Hurlbut | 211/17 |
| 569,289 | 10/1896 | Lynch | 211/17 |
| 610,656 | 4/1897 | Martin | 211/18 |
| 3,379,401 | 4/1968 | Pellegrino | 211/22 X |
| 4,394,948 | 7/1983 | Graber | 224/329 X |
| 4,728,244 | 3/1988 | Stokkendal | 224/319 X |
| 4,887,754 | 12/1989 | Boyer et al. | 211/17 X |
| 4,936,480 | 6/1990 | Apostolo | 224/319 X |
| 5,078,276 | 1/1992 | Rogge et al. | 211/18 |
| 5,118,020 | 6/1992 | Piretti | 224/329 X |

FOREIGN PATENT DOCUMENTS

| | | | |
|---|---|---|---|
| 613426 | 11/1926 | France | 248/206.1 |
| 22261 | of 1896 | United Kingdom | 211/18 |
| 4281 | of 1897 | United Kingdom | 211/18 |
| 8850 | of 1897 | United Kingdom | 211/18 |
| 24321 | of 1897 | United Kingdom | 211/18 |

*Primary Examiner*—Alvin C. Chin-Shue
*Assistant Examiner*—Korie H. Chan
*Attorney, Agent, or Firm*—Wayne D. House

[57] ABSTRACT

A portable bicycle stand repair capable of being removably attached to a smooth and approximately vertical surface such as the side of a motor vehicle. The portable bicycle repair stand incorporates at least one suction cup capable of being removably and securely attached to a smooth surface such as a sheet metal or glass vehicle surface. The lower end of the bicycle repair stand rests on the surface of the ground. A rotatably attached bicycle frame clamp is used to securely and releasably grip a bicycle frame and allows the bicycle to be rotated into a desired position and locked into place. The portable bicycle stand optionally incorporates height adjusting means.

12 Claims, 11 Drawing Sheets

PORTABLE BICYCLE REPAIR STAND

This application is a continuation-in-part of application Ser. No. 07/729,059, filed Jul. 12, 1991 now abandoned.

FIELD OF THE INVENTION

The present invention relates to a portable bicycle repair stand.

BACKGROUND OF THE INVENTION

Conventional bicycle repair stands are rigid and heavy duty devices which are securely attached to a floor or to a vertical building support member. These stands incorporate a clamping device to grip the bicycle frame which allows the bicycle to be rotated to any position in order to facilitate work on any component of the bicycle, for example to allow a convenient change of the drive sprocket.

Bicycles are routinely transported via motor vehicles to various locations for use. It is frequently found on arrival at the new location that further changes to the bicycle are required to achieve optimum performance at the new location. This is a common situation particularly for competitive bicycle events such as road racing or mountain bike events. Furthermore, even if a bicycle was ideally set up in a shop, after many miles of motor vehicle transport it may be found necessary to readjust various components of the bicycle in order to achieve optimal performance after arrival at the event location. Portable bicycle stands are desirable for such situations. Several designs are presently available, however, these devices rely entirely on legs or flat metal plates for their support. Consequently they are much less than perfectly stable.

SUMMARY OF THE INVENTION

The present invention comprises a portable bicycle repair stand which may be removably attached to a smooth surface such as the side of a motor vehicle. The portable bicycle repair stand comprises a vertical support member having a horizontally oriented U-shaped cross member secured at its midpoint near the upper end of the vertical support member. Each of the two ends of the horizontally oriented U-shaped cross member has an attached suction cup for securing the bicycle stand to a smooth surface such as the glass or sheet metal surfaces of a car or truck. The lower end of the vertical support member rests on the surface of the ground. A bicycle frame clamp is rotatably attached to the upper end of the vertical supporting member via a horizontal bicycle support member so that the clamp faces in the opposite direction as the suction cups. The rotatable attachment of the bicycle frame clamp to the horizontal bicycle support member incorporates a means for locking the clamp into any desired rotational position.

In an alternative embodiment, the bicycle repair stand uses rubber pads attached to the ends of the U-shaped arm and a single suction cup attached to the end of a horizontal center member located between the ends of the U-shaped arm.

DETAILED DESCRIPTION OF THE INVENTION

Figure 1:
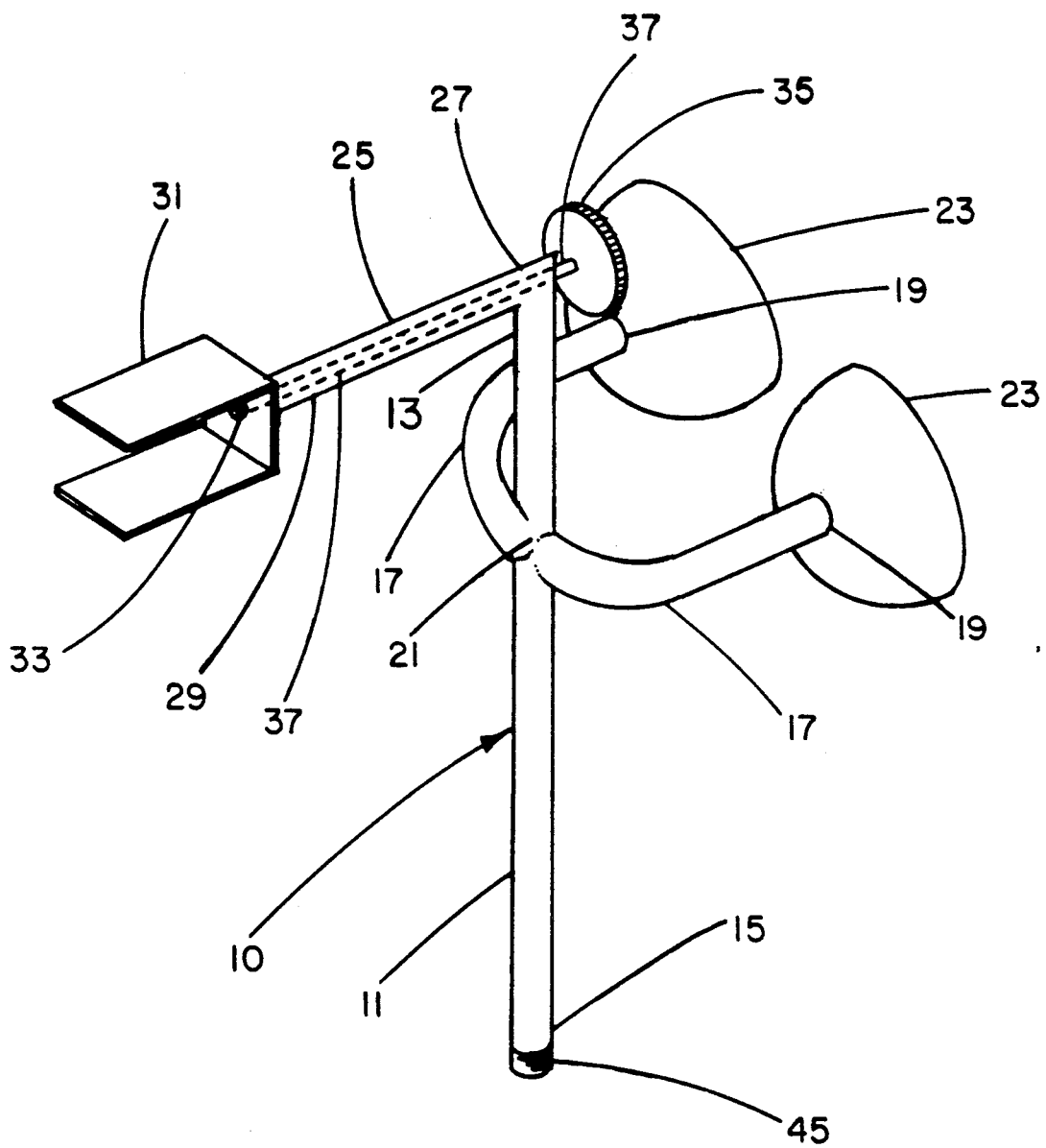
FIG. 1 shows a perspective view of the portable bicycle stand of the present invention.

FIG. 1 shows a perspective view of the portable bicycle repair stand 10 of the present invention. It comprises a vertical support member 11 having an upper end 13 and a lower end 15. The vertical support member 11 also has a rigidly attached U-shaped cross member 17 lying in a horizontal plane. The U-shaped cross member 17 has two ends 19 and a midpoint 21. The attachment point is near the upper end of the vertical support member 11 and at the midpoint 21 of the U-shaped cross member 17. The attachment point should be located high enough to allow a bicycle to be rotated through 180 degrees. Both the vertical support member 11 and the U-shaped cross member 17 are preferably of metal tubing, preferably steel although aluminum may be used as well. The wall thickness of the tubing must be adequate to support the weight of a bicycle. The U-shaped cross member 17 is preferably attached to the vertical support member 11 by welding.

A suction cup 23 is attached to each end 19 of the U-shaped cross member 17. The suction cups 23 must be of adequate size to allow the bicycle repair stand 10 to be securely attached to a smooth, vertical surface such as the side of a motor vehicle. At least 3.25 inch diameter suction cups are preferred such as part number VC-HL3.25 from Vi-Cas Manufacturing Company, Inc., Cincinnati, Ohio. This suction cup is attached with a ⅜16 stud molded into the center of the suction cup.

Figure 2:
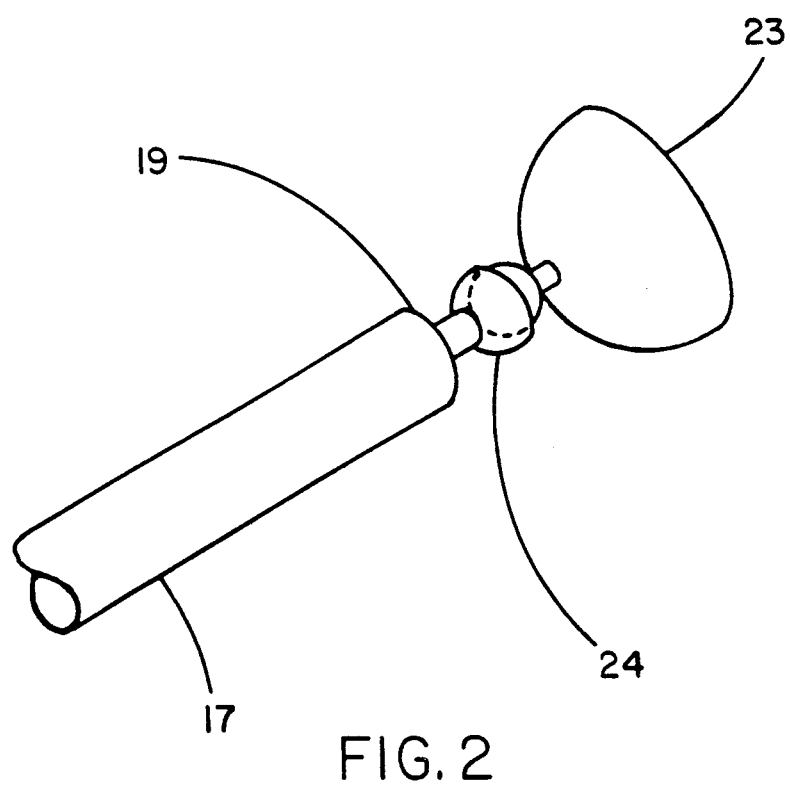
FIG. 2 shows an optional swivelable attachment for the suction cups.

The suction cups 23 may optionally be swivelably attached to the ends 19 of the U-shaped cross member 17. A swivelable attachment will allow the portable bicycle repair stand to be attached to a smooth surface that deviates significantly from vertical, for example a seventy degree rather than a ninety degree surface as measured from the horizontal. A swivelable suction cup attachment 24 incorporating ball joints is shown by FIG. 2.

The first end 27 of a horizontal bicycle support member 25 is rigidly attached to the upper end 13 of the vertical support member 11. It is oriented so that the second end 29 of the horizontal bicycle support member 25 points away from the ends 19 of the U-shaped cross member 17. The length of the horizontal bicycle support member 25 must be adequate to allow the handle bars to clear the vertical support member 11 during rotation of the bicycle. A bicycle frame clamp 31 is rotatably attached to the second end 29 of the horizontal bicycle support member 25. The bicycle frame clamp 31 is any suitable device capable of releasably gripping a frame member of a bicycle in a secure manner to prevent inadvertent movement of the bicycle during repair. This must be accomplished without damage to the finish of the bicycle frame. One such suitable bicycle frame clamp is a clamp made by Answer Products, Inc., Valencia, Calif., part number 07-0010. The rotatable attachment 33 of the bicycle frame clamp 31 to the second end 29 of the horizontal bicycle support member 25 must be capable of being securely locked into position after the bicycle frame clamp has been rotated to the desired position. The means for locking necessary to accomplish this must be functional with a bicycle gripped within the bicycle frame clamp 31. As one example of an appropriate means for locking, FIG. 1 shows a large nut 35 that can be tightened or loosened by hand. The nut 35 allows the bicycle frame clamp 31 to be locked into a desired rotational position via a threaded rod 37 located within the horizontal bicycle support member 25.

Figure 3:
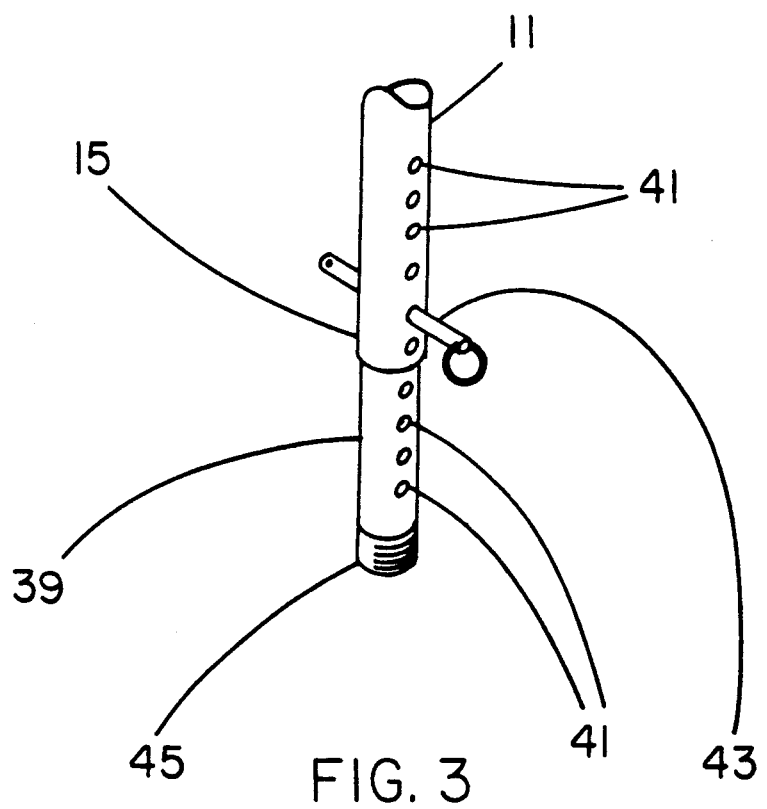
FIG. 3 shows an optional height adjusting means.

FIG. 3 shows an optional height adjusting means in the form of a smaller diameter tube 39 fitted telescopically within the lower end 15 larger diameter vertical support member 11. A series of horizontally oriented small diameter holes 41 are drilled at intervals of preferably about one inch through both walls of the lower end 15 of the vertical support member 11 and through both walls of the telescoping smaller diameter tube 39. Height adjustment is accomplished by placing a locating pin 43 through aligned small diameter holes 41 in both the larger diameter vertical support member 11 and the smaller diameter tube 39 to provide the desired bicycle working height. The bottom of the small diameter tube 39 should be provided with a cap or cover 45 to keep dirt out of the tube and to support the bicycle repair stand 10 on the surface of the ground.

Figure 4:
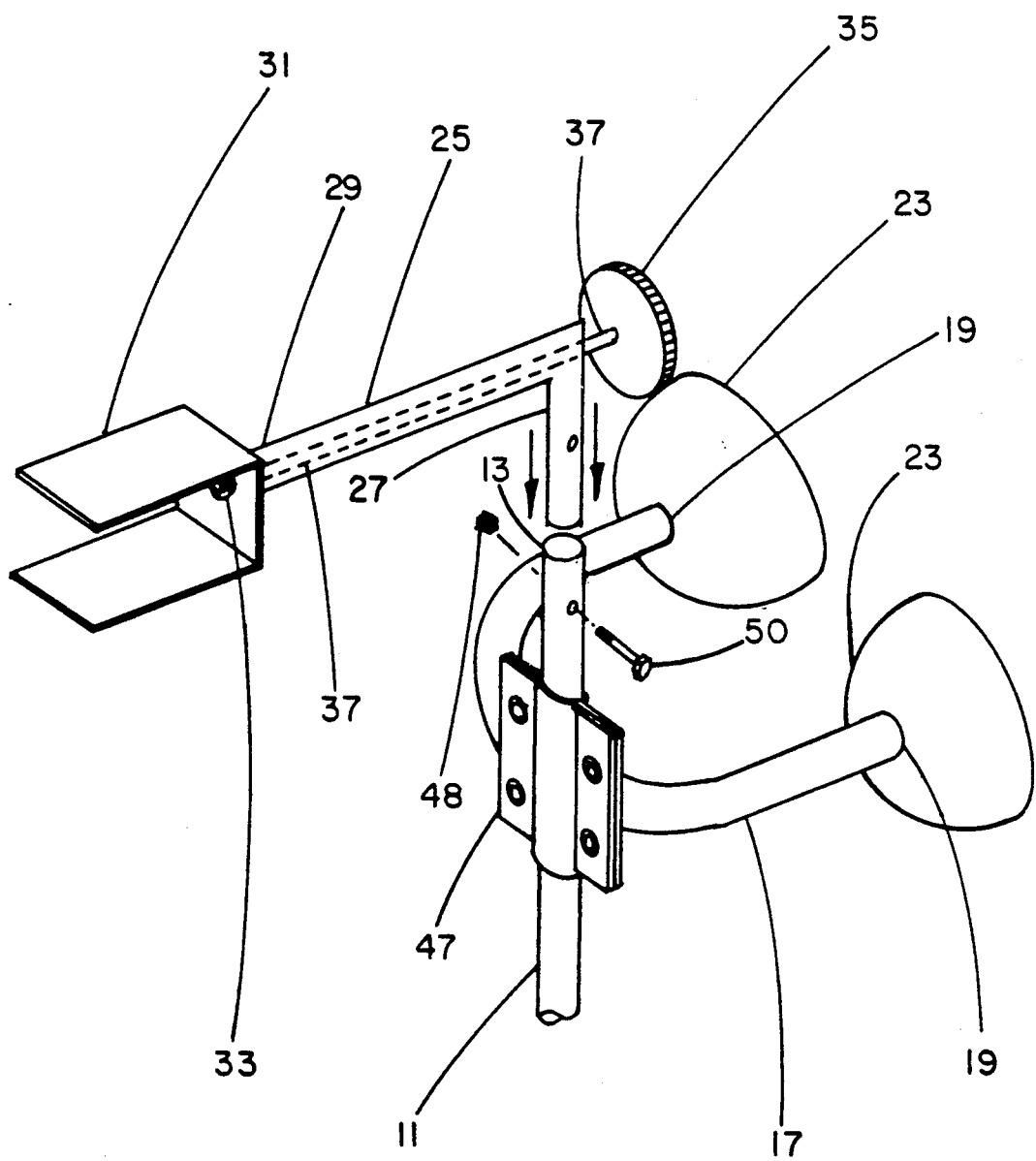
FIG. 4 shows an optional attachment of the U-shaped cross member to the vertical support member allowing removal and height adjustment of the U-shaped cross member.

FIG. 4 shows a perspective view of an alternative embodiment in which the U-shaped cross member 17 is secured to the vertical support member 11 by a clamping device 47. This allows the U-shaped cross member 17 to be secured to the vertical support member 11 at any desired height. This embodiment also allows the U-shaped cross member 17 to be removed from the vertical support member 11 for ease of storage. Similarly, the horizontal bicycle support 25 member may optionally be made to be removable from the vertical support member 11 in order to provide greater ease of storage when the bicycle repair stand is not in use. In use, the horizontal bicycle support member 25 is preferably secured to the upper end 13 of the vertical support member 11 by a bolt 50 and nut 48.

Figure 5A:
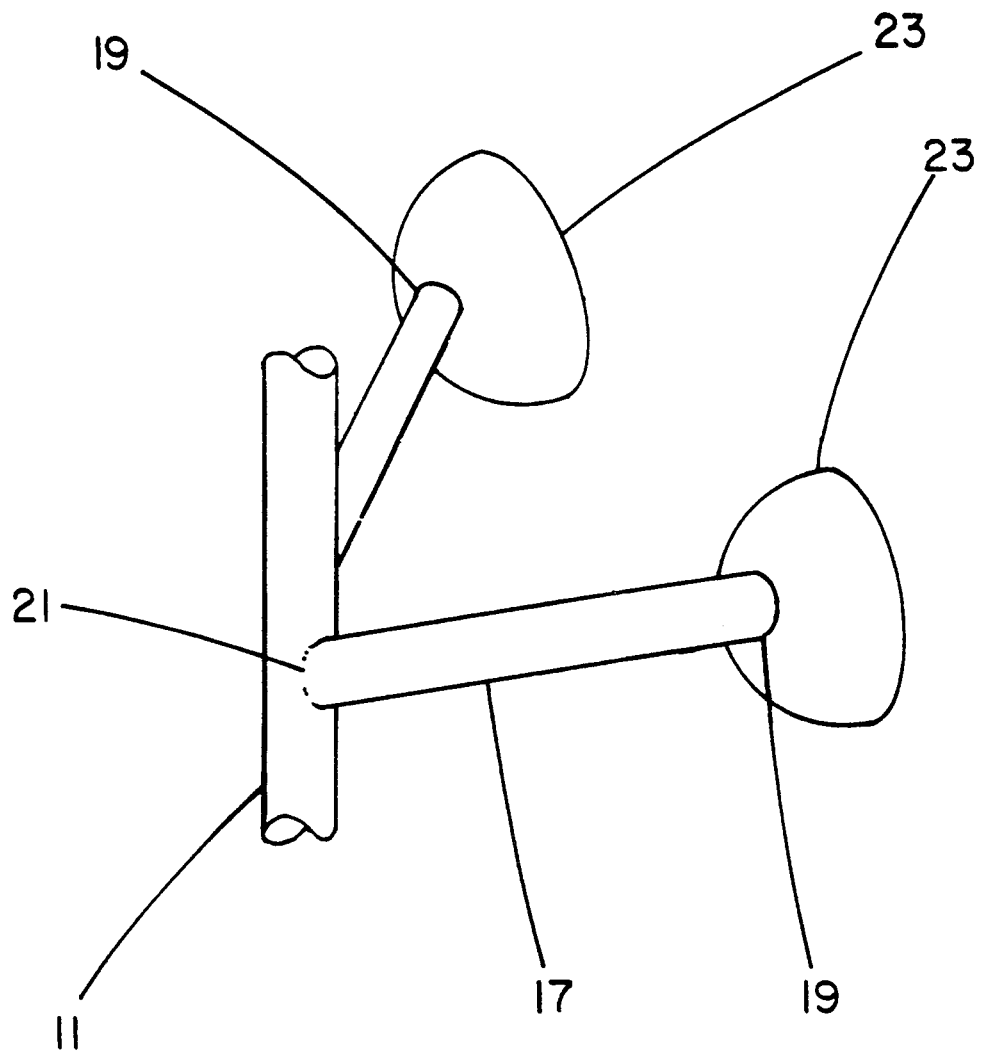
FIGS. 5A, 5B, 5C, 5C and 5E show alternative embodiments of the U-shaped cross member.
Figure 5B:
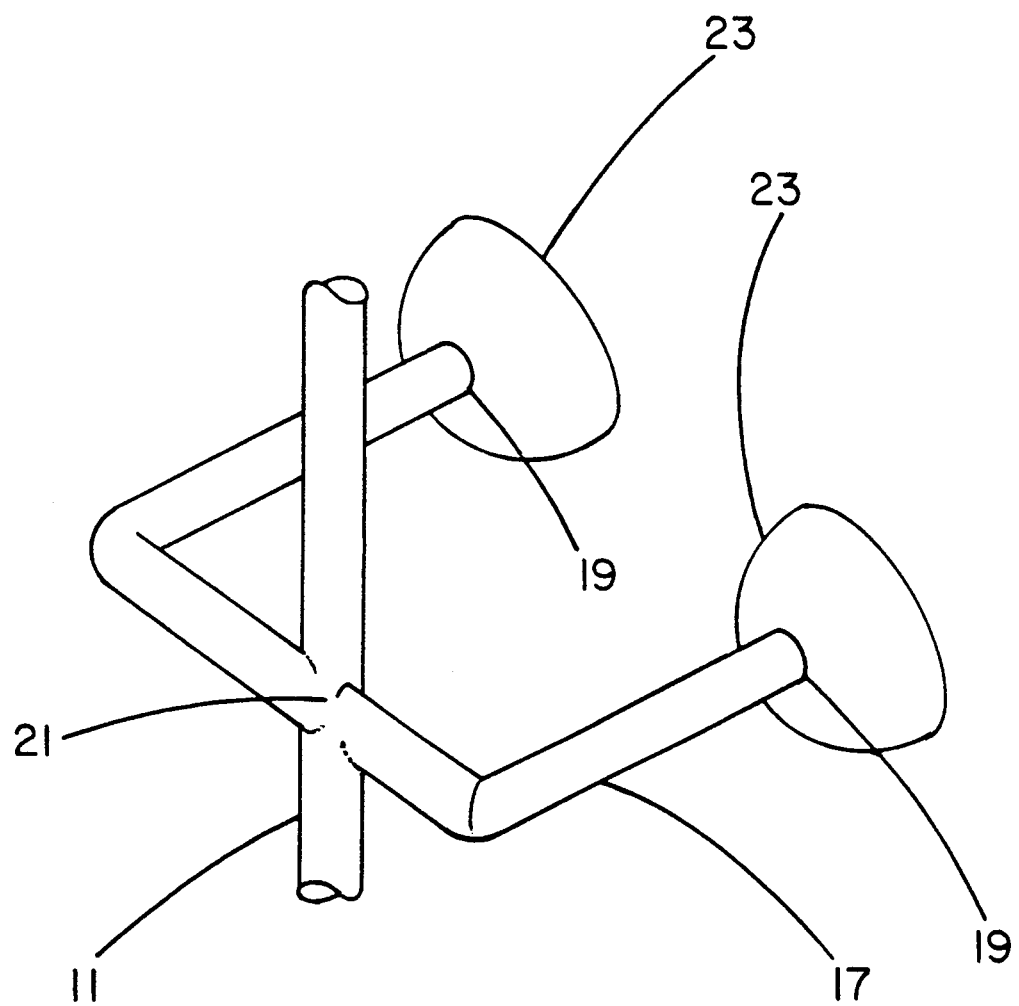
Figure 5C:
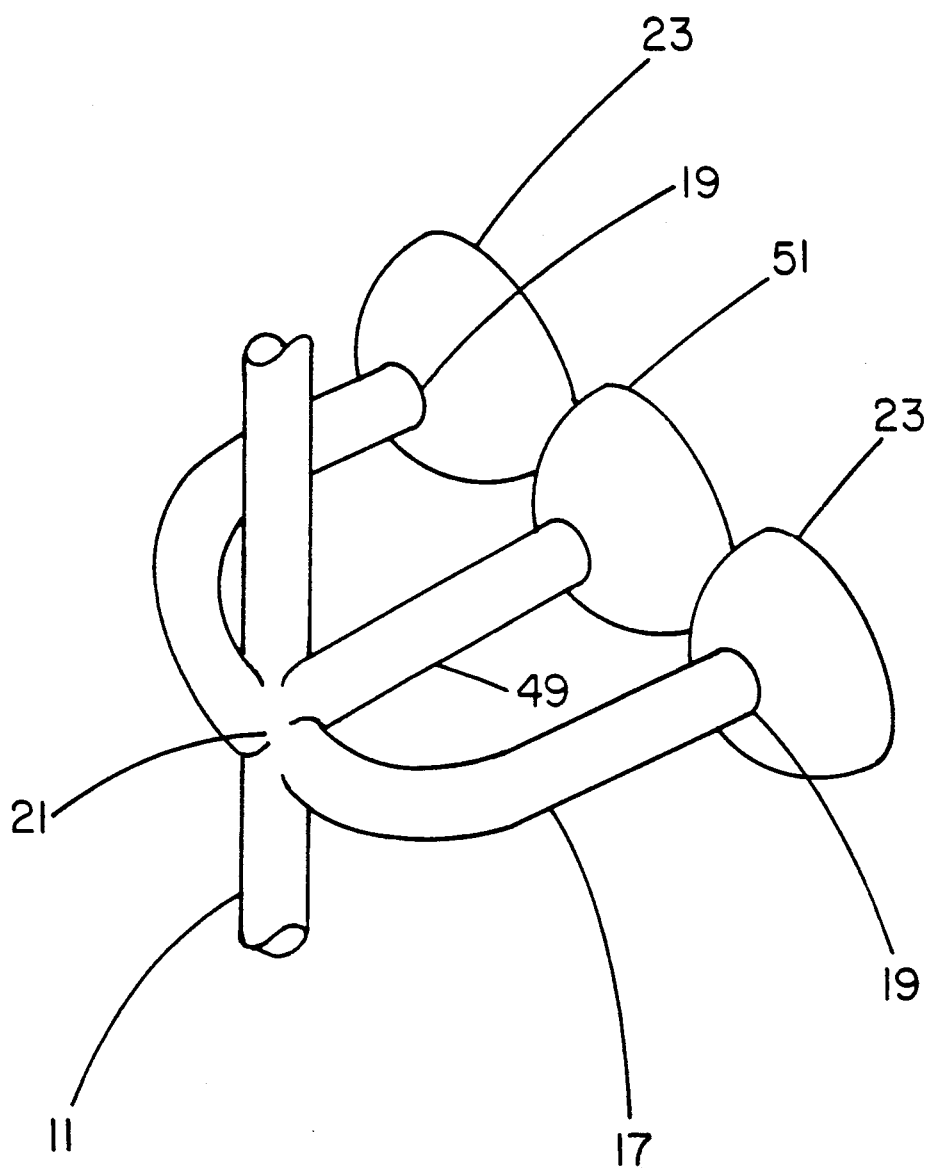
Figure 5D:
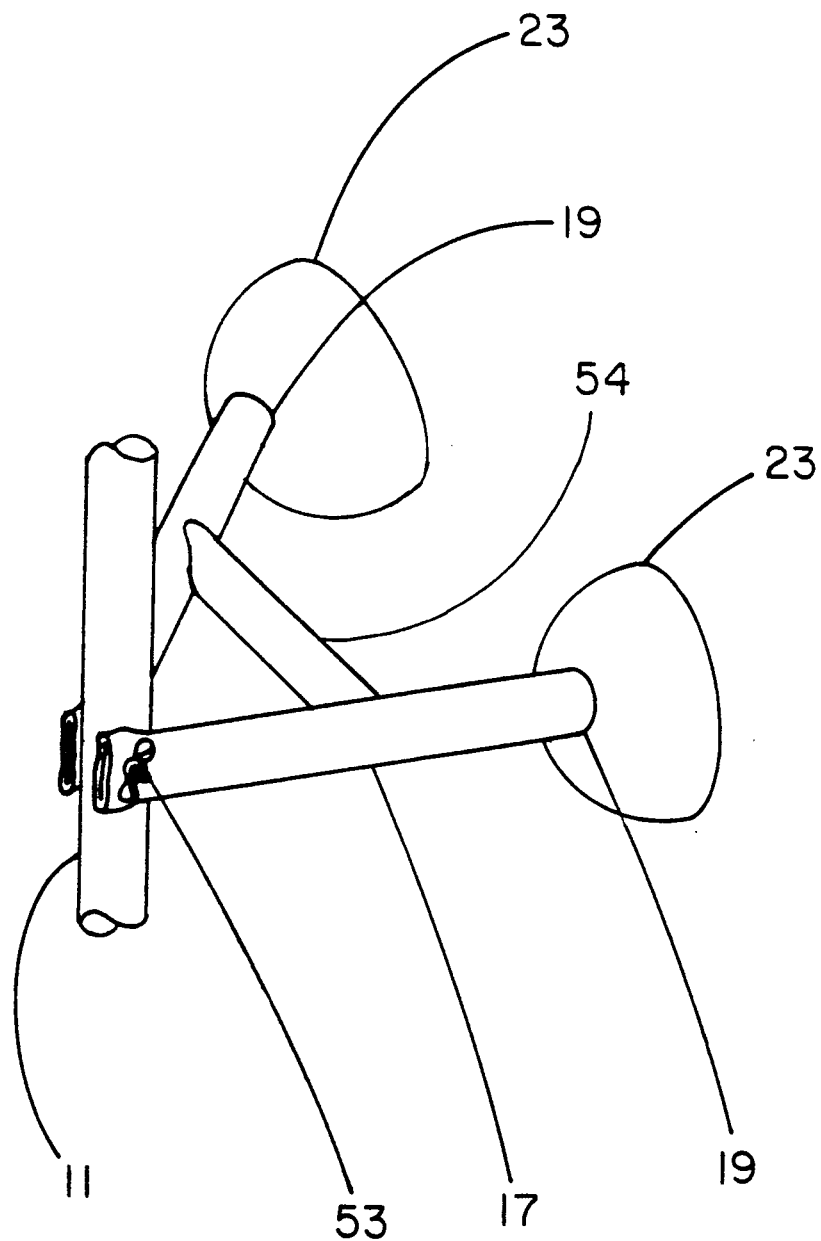

FIGS. 5A, 5B, 5C and 5D show alternative embodiments of the U-shaped cross member. FIG. 5A shows the U-shaped cross member shaped in the form of a V; FIG. 5B shows the U-shaped cross member having right-angle corners instead of radiused corners; FIG. 5C describes a U-shaped cross member having an added horizontal center member 49 perpendicularly attached to the vertical support member 11 to provide a third suction cup 51 in the same plane as the other two suction cups 23. FIG. 5D shows an alternative embodiment wherein the U-shaped cross member 17 is swivelably and lockably attached as with a bolt and wingnut 53. This is an alternative method whereby a less than perfectly vertical surface may be accommodated by the inventive portable bicycle repair stand. This embodiment also adds a connecting cross member 54 between the two arms of the U-shaped cross member 17.

Figure 5E:
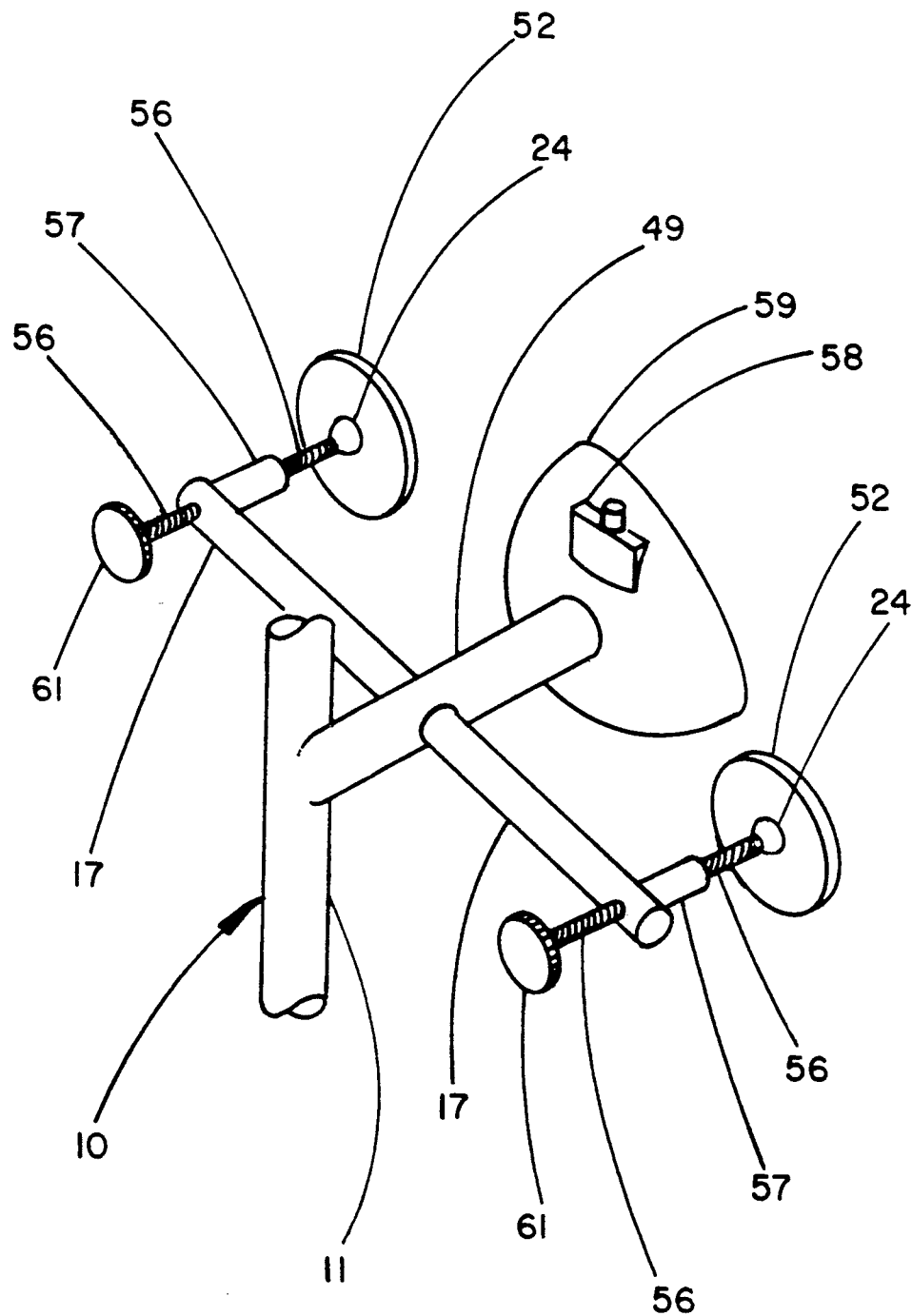

FIG. 5E describes a further embodiment which is a variation of the embodiment of FIG. 5C. As shown by FIG. 5E, horizontal center member 49 is substantially perpendicularly attached to the vertical support member 11 at about the midpoint of the U-shaped cross member 17 with the opposite end of the horizontal support member 49 having an attached suction cup 59. By substantially perpendicularly attached is meant that the U-shaped cross member and horizontal cross member are attached to the vertical cross member at an angle of approximately 90°; this attachment may optionally include some provision for a few degrees of adjustment. The embodiment of FIG. 5E differs from that of FIG. 5C in that suction cup 59 is the only suction cup used. The two suction cups 23 at the ends of the U-shaped cross member 17 are replaced by extendable pads 52 which are preferably attached to the ends of the U-shaped cross member 17 with swivels 24. The pads 52 should be made of a relatively compressible material, such as, for example, neoprene rubber. This embodiment is possible when using a strong suction cup 59 at the end of the added horizontal center member 49. This suction cup 59 preferably incorporates a manually operated vacuum pump 58 which allows a particularly strong attachment to be achieved. A suction cup 59 of this type is available from Wood's Powr-Grip Company in Laurel, Mont. In use, the single suction cup 59 of this embodiment is adhered to the desired surface and then the extendable pads 52 are extended toward the desired surface until they are secure against that surface. The extending function of the pads 52 is most easily accomplished by attaching one end of a male threaded component 56 to this pad 52 via a swivel 24. Male threaded component 56 mates with a corresponding female threaded end 57 on the U-shaped cross member 17. The other end of the male threaded component 56 is attached to a knob 61. The pads 52 may be easily extended against the desired surface by rotating the knob 61 causing the pads 52 to unscrew and extend from their attachment to the female-threaded ends 57 of the U-shaped cross member 17. When the pad 52 contacts the desired surface, the swivel 24 allows the pad to grip the surface while the male threaded component 56 is rotated relative to the pad 52 to cause compression of the pad 52. In use, the extended pads 52 serve as stabilizing outriggers while the single suction cup 59 holds the bike stand 10 securely attached to the desired surface. Removal of the bike stand is the reverse of the attachment procedure.

Figure 6:
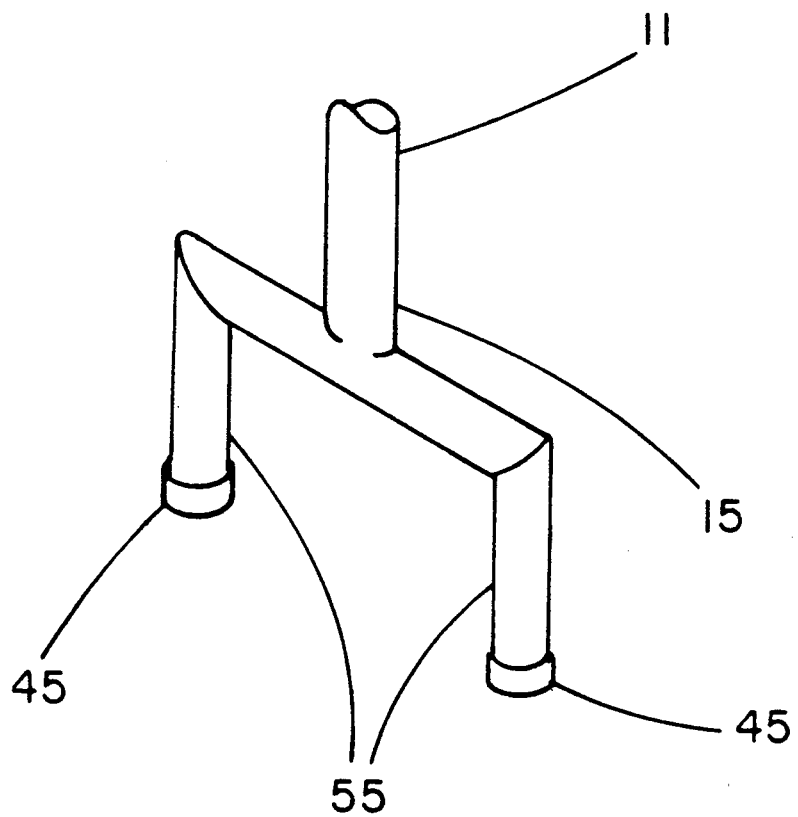
FIG. 6 shows an alternative embodiment incorporating a pair of feet.

FIG. 6 shows an alternative embodiment having a pair of support feet 55 attached to the lower end of the vertical support member 11. This embodiment may offer increased stability under certain circumstances.

Figure 7:
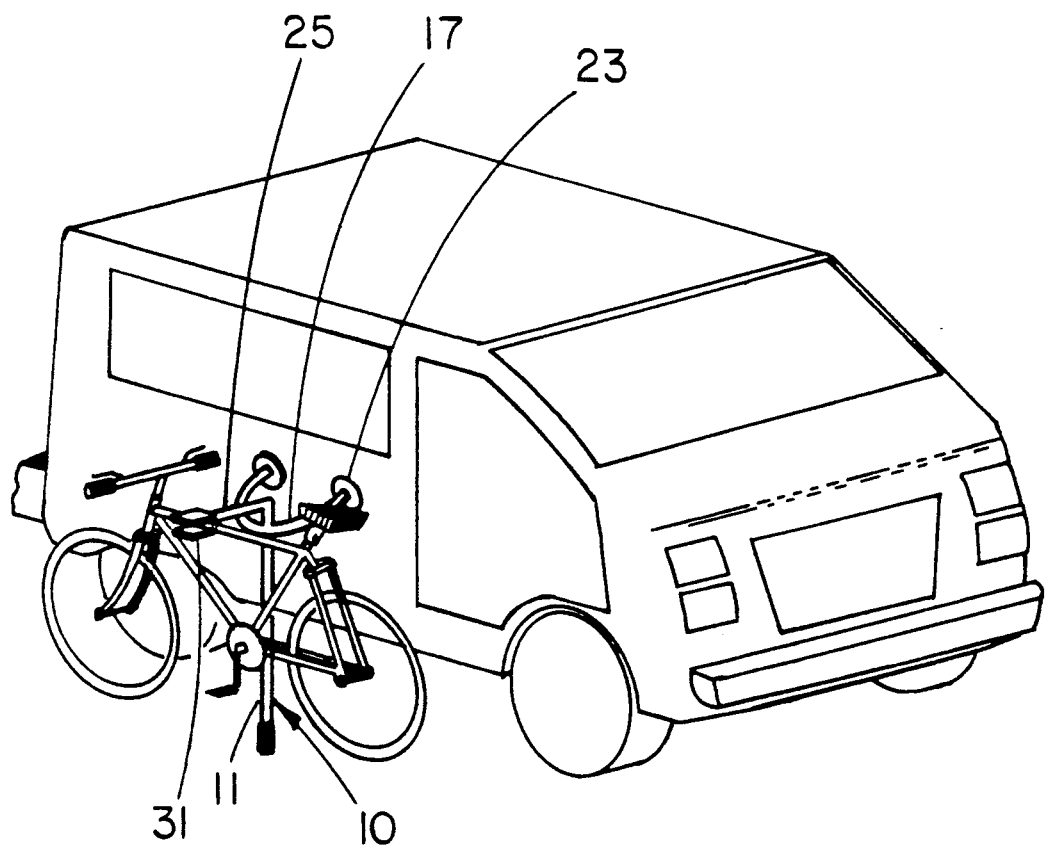
FIG. 7 shows a perspective view of the portable bicycle stand in use.

FIG. 7 shows the portable bicycle stand in use. The bicycle stand is releasably attached via the large suction cups 23 to a smooth vertical surface, in this case the side of a vehicle. A bicycle is gripped by its frame with the bicycle frame clamp. The bicycle is shown having been rotated into a convenient position for a change of drive sprockets.

I claim:

1. A portable bicycle repair stand capable of being removably attached to a smooth and approximately vertical surface, comprising:
   a) a vertical support member having an upper and a lower end;
   b) a U-shaped cross member having two ends and a midpoint, the U-shaped cross member lying in a horizontal plane, the midpoint of the U-shaped cross member attached to the vertical support member near the upper end of the vertical support member;
   c) a suction cup attached to each of the two ends of the U-shaped cross member;

d) a horizontal bicycle support member having first and second ends, the first end of the horizontal bicycle support member attached to the upper end of the vertical support member, the second end of the horizontal bicycle support member pointing away from ends of the U-shaped cross member;

e) a bicycle frame clamp, rotatably attached to the second end of the horizontal bicycle support member; and f) means for locking the bicycle frame clamp into any rotational position.

2. A portable bicycle repair stand according to claim 1 wherein the vertical support member incorporates means for height adjusting.

3. A portable bicycle repair stand according to claim 2 wherein the means for height adjusting incorporates a smaller diameter tube fitted telescopically within the lower end of the vertical support member.

4. A portable bicycle repair stand according to claim 1 wherein the horizontal support member is removable.

5. A portable bicycle repair stand according to claim 1 wherein a pair of supporting feet are attached to the lower end of the vertical support member.

6. A portable bicycle repair stand according to claim 1 wherein a horizontal center member is substantially perpendicularly attached to the vertical support member, and further having an additional suction cup attached to the horizontal center member.

7. A portable bicycle repair stand according to claim 1 wherein the U-shaped cross member is removably attached to the vertical support member.

8. A portable bicycle repair stand according to claim 7 wherein the U-shaped cross member may be attached at adjustable heights to the vertical support member.

9. A portable bicycle repair stand according to claim 1 wherein the suction cups are swivelably attached to the two ends of the U-shaped cross member.

10. A portable bicycle repair stand according to claim 1 wherein the U-shaped cross member is swivelably and lockably attached to the vertical support member.

11. A portable bicycle repair stand capable of being removably attached to a smooth and approximately vertical surface, comprising:

a) a vertical support member having an upper and a lower end;

b) a U-shaped cross member having two ends and a midpoint, the U-shaped cross member lying in a horizontal plane, the midpoint of the U-shaped cross member attached to the vertical support member near the upper end of the vertical support member;

c) a horizontal center member substantially perpendicularly attached at one end to the vertical support member at about the midpoint of the U-shaped cross member, and having a suction cup attached to the opposite end of the horizontal support member;

d) extendable pads attached with swivels to each of the two ends of the U-shaped cross member;

e) a horizontal bicycle support member having first and second ends, the first end of the horizontal bicycle support member attached to the upper end of the vertical support member, the second end of the horizontal bicycle support member pointing away from the two ends of the U-shaped cross member;

f) a bicycle frame clamp, rotatably attached to the second end of the horizontal bicycle support member; and g) means for locking the bicycle frame clamp into any rotational position.

12. A portable bicycle repair stand according to claim 11 wherein the vertical support member incorporates means for height adjusting.

* * * * *